United States Patent
Doron et al.

(10) Patent No.: US 9,232,218 B2
(45) Date of Patent: Jan. 5, 2016

(54) SYSTEM AND METHOD FOR DATA INSERTION IN VIDEO STREAM

(71) Applicants: Eli Doron, Ganei Tikva (IL); Maoz Loants, Moshav Tnuvot (IL)

(72) Inventors: Eli Doron, Ganei Tikva (IL); Maoz Loants, Moshav Tnuvot (IL)

(73) Assignee: CONNESTA, Ganei-Tikva ( * ) Notice: Subject to any disclaimer, the term of this patent is extended or adjusted under 35 U.S.C. 154(b) by 280 days.

(21) Appl. No.: 13/769,909

(22) Filed: Feb. 19, 2013

(65) Prior Publication Data

US 2013/0230110 A1 Sep. 5, 2013

Related U.S. Application Data

(60) Provisional application No. 61/605,251, filed on Mar. 1, 2012.

(51) Int. Cl.
*H04N 11/02* (2006.01)
*H04N 19/46* (2014.01)
*H04N 21/2343* (2011.01)
*H04N 21/431* (2011.01)
*H04N 21/6547* (2011.01)
*H04N 5/45* (2011.01)

(52) U.S. Cl.
CPC . *H04N 19/00545* (2013.01); *H04N 21/234345* (2013.01); *H04N 21/4316* (2013.01); *H04N 21/6547* (2013.01); *H04N 5/45* (2013.01)

(58) Field of Classification Search
CPC .............. H04N 19/00545; H04N 5/45; H04N 21/234345; H04N 21/4316; H04N 21/6547
See application file for complete search history.

(56) References Cited

U.S. PATENT DOCUMENTS

| | | | | |
|---|---|---|---|---|
| 5,715,014 A * | 2/1998 | Perkins et al. | | 725/28 |
| 6,931,660 B1 | 8/2005 | Kalluri | | |
| 6,973,130 B1 * | 12/2005 | Wee et al. | | 375/240.16 |
| 8,369,397 B2 | 2/2013 | Bordes | | |
| 2004/0168185 A1 * | 8/2004 | Dawson et al. | | 725/38 |
| 2006/0282737 A1 * | 12/2006 | Shi et al. | | 714/746 |

* cited by examiner

*Primary Examiner* — Tat Chio

(57) ABSTRACT

A system for video processing includes a video director, a video encoder, and a picture-in-picture inserter. The video director is configured to generate an edit signal. The video encoder is configured responsively to the edit signal to encode a first area of a video frame of a main video as a first encoded data set, to encode a second area of the video frame as a second encoded data set, and to generate a compressed main video including the first and second encoded data sets. The picture-in-picture (PIP) inserter is configured, responsively to the compressed main video and to a compressed secondary video including a third encoded data set, to generate a compressed PIP video including the first encoded data set and the third encoded data set, and to transmit the compressed PIP video for subsequent decoding.

16 Claims, 6 Drawing Sheets

FIG. 3A

| 0 | 1 | 2 | 3 |
|---|---|---|---|
| 4 | 5 | 6 | 7 |
| 8 | 9 | 10 | 11 |

| 0 | 1 | 2 | 3 | 4 | 5 | 6 |
|---|---|---|---|---|---|---|
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |
| 35 | 36 | 37 | 38 | 39 | 40 | 41 |

| PPS | SLICE 1 2ND MBs 0-3 | SLICE 2 2ND MBs 4-7 | SLICE 3 2ND MBs 8-11 |
|---|---|---|---|

| PPS | SLICE 1 MAIN MBs 0-14 | SLICE 2 OUT MBs 15-18 | SLICE 3 MAIN MBs 19-21 | SLICE 4 OUT MBs 22-25 | SLICE 5 MAIN MBs 26-28 | SLICE 6 OUT MBs 29-32 | SLICE 7 MAIN MBs 33-41 |
|---|---|---|---|---|---|---|---|

SYSTEM AND METHOD FOR DATA INSERTION IN VIDEO STREAM

RELATED APPLICATION

This application claims priority from U.S. Provisional Patent Application 61/605,251, filed Mar. 1, 2012, the disclosure of which is incorporated by reference.

TECHNICAL FIELD

The technology disclosed relates to the transmission of live video and in particular to the merging of multiple video streams.

BACKGROUND

A television broadcast station may broadcast a primary video feed from multiple sources, such as live events, studio broadcasts, or pre-recorded shows, and may process multiple video feeds such that the broadcast appears to overlay multiple feeds as a "picture-in-picture," or "video-in-video" feed.

Digital video processing of video transmissions increases transmission latency, which may affect the synchronization of a video feed with a corresponding audio feed. To achieve adequate bit rates, videos before transmission are typically compressed, that is, encoded, to reduce bandwidth requirements.

MPEG-1, MPEG-2, and H.264 are common compression standards, the first two having been widely replaced by the more recent H.264 standard. The H.264 standard is a publication of the International Telecommunication Union—Telecommunication Standardization Sector (ITU-T), also referred to as the MPEG-4 Part 10, Advanced Video Coding (AVC) standard 14496-10 of ISO/IEC, the teachings of which are incorporated herein by reference. H.264/AVC has a reference software implementation that includes a Joint Model (JM) Reference H.264 Encoder and a JM Reference H.264 Decoder. The reference software is accompanied by the H.264/AVC Reference Software Manual, authored by the Joint Video Team (JVT) of ISO/IEC MPEG & ITU-T VCEG (working groups: ISO/IEC JTC1/SC29/WG11 and ITU-T SG16 Q.6), the teachings of which are also incorporated herein by reference.

A basic H.264 compression profile, the constrained baseline profile, includes features that are compliant with most H.264 profiles in common use.

An H.264 encoder compresses a video by frames, that is, by individual images or pictures. Each frame is compressed by determining a residual difference between content of each macroblock of pixels in the frame and a prediction of that macroblock content. For inter-frame prediction, also referred to as motion-compensated prediction, predictions are based on macroblocks of prior frames. For intra-frame prediction, prediction is based on macroblocks from the same frame. High Efficiency Video Coding (HEVC) also referred to as H.265, is a newer standard being developed that includes similar compression methodology.

Video feeds compressed by the H.264 standard may contain multiple distinct videos. U.S. Pat. No. 8,369,397 to Bordes et al., whose disclosure is incorporated herein by reference, describes the insertion of a logo over a main video feed by several mechanisms, such as including the logo as a redundant coded picture or by means of flexible macroblock ordering (FMO). U.S. Pat. No. 6,931,660 to Kalluri et al., whose disclosure is incorporated herein by reference, describes merging two MPEG 2 videos.

SUMMARY

Embodiments of the present invention provide systems and methods for controlling efficient data insertion in a video stream, where the insertion is performed at a point in a network between the source of the video stream and a destination.

There is therefore provided, in accordance with an embodiment of the present invention, a system for video processing including a video director, a video encoder, and a picture-in-picture inserter. The video director is configured to generate an edit signal. The video encoder is configured responsively to the edit signal to encode a first area of a video frame of a main video as a first encoded data set, to encode a second area of the video frame as a second encoded data set, and to generate a compressed main video including the first and second encoded data sets. The picture-in-picture (PIP) inserter is configured, responsively to the compressed main video and to a compressed secondary video including a third encoded data set, to generate a compressed PIP video including the first encoded data set and the third encoded data set, and to transmit die compressed PIP video for subsequent decoding.

In some embodiments, the edit signal is a first edit signal, and the video director is further configured to transmit the first edit signal to the video encoder and to transmit a second edit signal to the PIP inserter, and the PIP inserter is configured to generate the compressed PIP video responsively to the second edit signal.

The first and second edit signals may include at least one parameter from a set including a position parameter, a dimension parameter, and a time parameter.

Typically, the main video is a live video stream and the video encoder is configured to generate the compressed main video and to simultaneously transmit the compressed main video to the PIP inserter, and the PIP inserter is configured to generate the compressed PIP video and to simultaneously transmit the compressed PIP video for subsequent decoding. In further embodiments, the PIP inserter may include multiple PIP inserters, and the compressed secondary video may include multiple, respective compressed secondary videos, each corresponding to one of the multiple PIP inserters. Each individual PIP inserter may be configured to generate a respective compressed PIP video responsively to the main video and to a corresponding compressed secondary video of the individual PIP inserter.

The compressed main, secondary, and PIP videos may be H.264 constrained baseline-compliant videos, and the first, second and third data sets may be image slices.

In further embodiments, the video encoder is a main video encoder and the system includes a secondary encoder configured to generate the compressed secondary video. The main encoder may be configured to set a Group of Picture (GOP) hierarchy in the compressed main video, and the secondary encoder may be configured to set the same Group of Picture (GOP) hierarchy in the compressed secondary video.

The video director is typically configured to generate the edit signal by providing an interactive display for overlaying a secondary video representing the compressed secondary video on a review video representing the main video.

The compressed secondary video may be one of multiple compressed secondary videos, each including a respective third encoded data set. The second area of the video frame may then be one of multiple second areas, and the video encoder may then be configured to encode the multiple second areas as multiple respective second encoded data sets and to generate a compressed main video including the first encoded data set and the multiple second encoded data sets.

In further embodiments, the video encoder is configured to generate the compressed main video by an H.264 encoding, whereby multiple macroblocks of the first area adjoining the second area are encoded with inter-frame prediction and with skip mode disabled.

There is further provided, in accordance with an embodiment of the present invention, a method of processing a video including receiving at a video encoder an edit signal generated at a video director, encoding at the video encoder, responsively to the edit signal, a first area of a video frame of a main video as a first encoded data set and a second area of the video frame as a second encoded data set, generating at the video encoder a compressed main video including the first and second encoded data sets, and transmitting the compressed main video from the video encoder to a PIP inserter. The method further includes, responsively to the compressed main video and to a compressed secondary video including a third encoded data set, generating at the PIP inserter a compressed PIP video including the first encoded data set and the third encoded data set, and transmitting the compressed PIP video from the PIP inserter for subsequent decoding.

In some embodiments, the method further includes receiving at the PIP inserter a second edit signal generated at the video director, and generating the compressed PIP video responsively to the second edit signal. The first and second edit signals may include at least one parameter from a set including a position parameter, a dimension parameter, and a time parameter.

The main video may be a live video stream, and generation of the compressed main video at the video encoder may include simultaneously transmitting the compressed main video to the PIP inserter, and generation of the compressed PIP video at the PIP inserter may include simultaneously transmitting the compressed PIP video for subsequent decoding. The method may also include generating multiple compressed PIP videos at multiple PIP inserters, responsively to the compressed main video and to multiple compressed secondary videos, each corresponding to a respective one of the multiple PIP inserters.

The method may also include generating the compressed secondary video at a secondary encoder.

In some embodiments, generating the edit signal includes providing an interactive display for overlaying a secondary video representing the compressed secondary video on a review video representing the main video.

In further embodiments, the secondary video is one of multiple compressed secondary videos, each including a respective third encoded data set. The second area of the video frame is one of multiple second areas, and the method further includes encoding the multiple second areas as multiple respective second encoded data sets, and generating the compressed main video including the first encoded data set and the multiple second encoded data sets.

Additionally, the compressed main video may be generated by an H.264 encoding, whereby multiple macroblocks of the first area adjoining the second area are encoded with inter-frame prediction and with skip mode disabled.

Embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

In the figures, which illustrate, by way of example only, embodiments of this invention:

FIGS. 3A and 3B are schematic illustrations of exemplary frames of a secondary video and of a main video compressed for a video insertion process, in accordance with an embodiment of the present invention;

FIGS. 4A and 4B are schematic illustrations of Network Abstraction Layer (NAL) views of the compressed secondary video and of the compressed main video, in accordance with an embodiment of the present invention;

FIGS. 7A and 7B are schematic illustrations of compressed main video frames, indicating aspects of compression processing, in accordance with an embodiment of the present invention; and FIGS. 8A-8C are schematic illustrations of compressed secondary video frames, indicating aspects of compression processing, in accordance with an embodiment of the present invention.

DETAILED DESCRIPTION

The following detailed description is made with reference to the figures.

Figure 1:
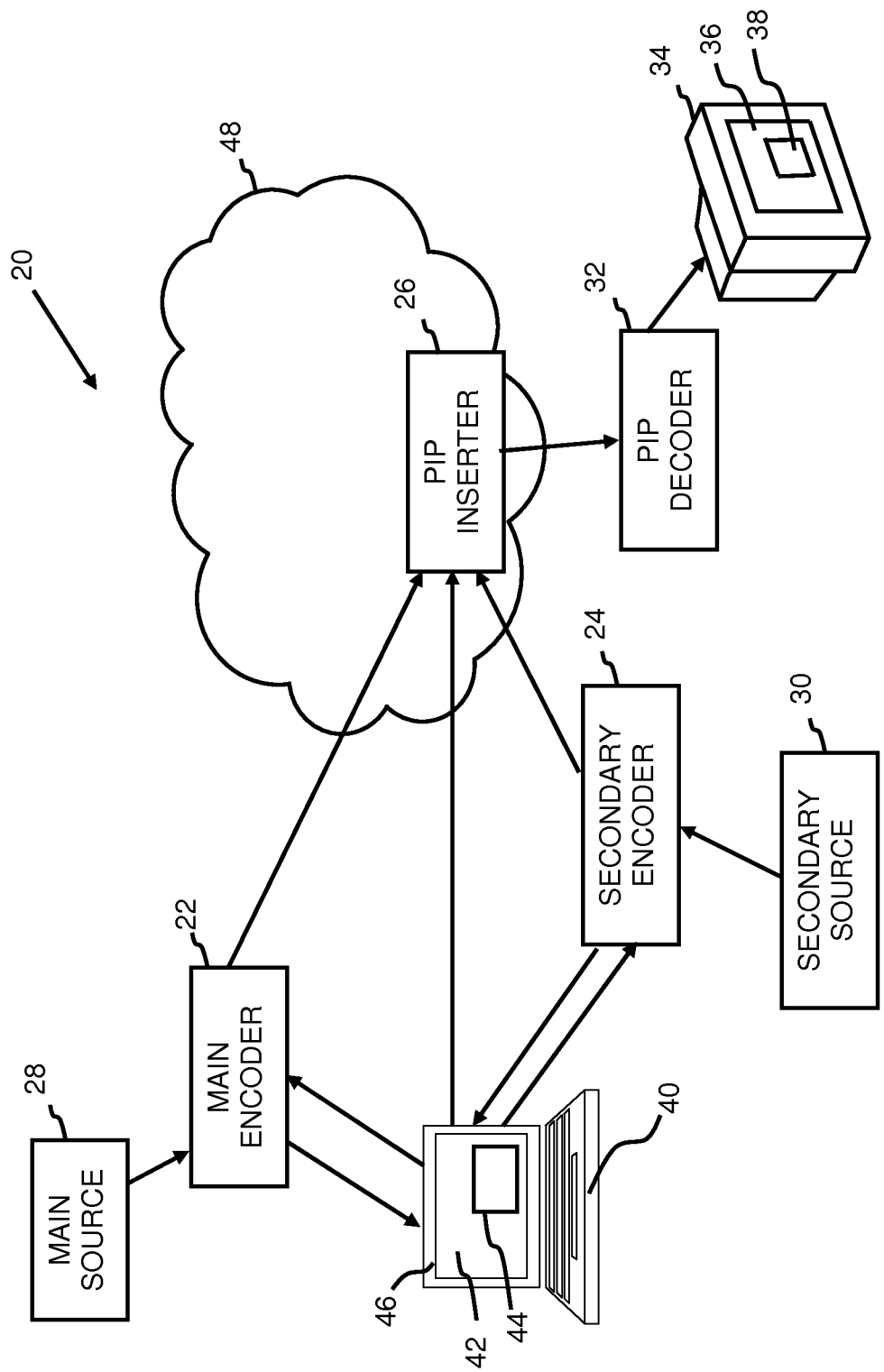
FIG. 1 is a schematic diagram illustrating a system for video processing, in accordance with an embodiment of the present invention.

FIG. 1 is a schematic diagram illustrating a system 20 for video processing. In typically embodiments, system 20 includes a first, or main encoder 22 configured to compress a main video, and a secondary video encoder, or secondary encoder 24 configured to compress a secondary video. A picture-in-picture (PIP) inserter 26 is configured to receive transmissions of the compressed main video and of the compressed secondary video and to perform a video insertion process that generates a compressed PIP video, described further hereinbelow.

The main encoder may be configured to receive the main video from a main source 28, and the secondary encoder may be configured to receive the secondary video from a secondary source 30. The main source and the secondary source may be cameras or other recording devices recording live events, for example public events or live studio sessions. Alternatively, the sources may be archived video recordings. In one embodiment, the main source may be recording and streaming to the main encoder a live event, such as an event occurring in Los Angeles, and the secondary source may be a database of pre-recorded videos; for example, advertisements targeting a particular viewing audience, such as an audience based in New York.

In typical embodiments the PIP inserter is further configured to transmit the compressed PIP video to one or multiple PIP decoders 32. The PIP decoders may be personal computing devices, which decode the compressed PIP video for one or more respective display devices 34. The PIP decoders are typically located at multiple locations.

Appearing on display device 34 will be a main image 36 of the main video, overlaid by a secondary video image 38 of the secondary video. The display device may be a television or personal computer, or other video viewing device. Typically, the PIP decoder is a component of the display device.

Typically the compressed main, secondary, and PIP videos are H.264-compliant videos, and the PIP decoder is an H.264 compliant decoder. In an embodiment of the present invention, the three types of compressed videos are compliant with the constrained baseline profile of the H.264 standard. In these embodiments, the PIP decoder is an H.264 constrained baseline-compliant decoder.

Edit signals including instructions related to the video insertion process may be transmitted from a video director system, referred to hereinbelow as a director 40, to the main and secondary encoders, as well as to the PIP inserter. The signals may specify a position at which the secondary video is to appear overlaid over the main video, as well as a dimension of the overlay and a time at which the overlay is to appear. Operations of the video director may be automated or may be controlled in real-time by a human operator. In some embodiments the video director includes some or all of the functionality of the operator's control room described in U.S. Patent Application Publication Number 2012/0200780, entitled, "Systems, Methods, and Operation for Networked Video Control Room," filed Feb. 6, 2012, to Doron, a co-inventor of the present invention.

In some embodiments, the main encoder transmits a review main video to the director, and the secondary encoder transmits a review secondary video to the director, such that a human operator of the director can manipulate relative positions of a review main video image 42 and of a review secondary video image 44 on a screen 46 of the director. Typically the review videos are live feeds of the same events that will be merged subsequently in the PIP video. The review videos are typically compressed by industry standard compression methods, such that the director may decode the compressed review videos by compatible standard methods before displaying the review videos for manipulation by the human operator.

The edit signals typically include data related to the relative positions determined by the visual manipulation on screen 46. In further embodiments, the secondary encoder may include multiple secondary encoders providing secondary videos from one or more insert sources, such that multiple review secondary videos may be provided for viewing and manipulation on the director.

The main encoder may be co-located with the main source, such that the main encoder is configured to receive from the main source an uncompressed video feed in analog or digital format; which the main encoder then compresses. An alternative embodiment, by which the main encoder is configured to receive a compressed main video, may require that the main encoder be configured to first decode (i.e., uncompress) the video before recompressing to suit the video insertion process. If the secondary source is an archive or repository, as opposed to a live event, a secondary video may be stored in the archive after being compressed by the secondary encoder, in which case the secondary encoder transmits to the PIP inserter such a pre-compressed secondary video.

The main encoder and the secondary encoder are configured to compress the respective main and secondary videos so as to suit the video insertion process performed by the PIP inserter. As described further hereinbelow, the PIP inserter is configured to generate the compressed PIP video without decoding or re-encoding either of the compressed main or secondary videos. Processing of a video at an intermediate point between a source and a destination of a transmission is often slowed by the need to uncompress and then recompress the video. Instead, the PIP inserter is configured to insert data from the compressed secondary video and the compressed main video directly into the compressed PIP video, generating the compressed PIP video on-the-fly without further encoding. For broadcasts of live events, reducing the latency of the video transmission from the main source to the display device is useful, especially as delays can cause a loss of synchronization between a video feed and its corresponding audio feed.

In some embodiments, the PIP inserter may operate as a process within a Content Delivery Network (CDN) or cloud computing network 48. The CDN may provide a reduced network distance between the PIP inserter and the display device to reduce bandwidth costs when multiple PIP inserters are operating in parallel in multiple geographic regions. In general, the components of system 20 are programmable or dedicated computing devices, or processes that run on such computing devices, or within a CDN. In some embodiments, the main and secondary encoders may be software implementations that incorporate the JM Reference H.264 Encoder, described hereinabove.

It is to be understood that transmissions between the director, the main and secondary encoders, and the PIP inserter may be by any method of communicating digital data. In some embodiments, the communications are by Internet or by dedicated leased lines.

In some embodiments, the secondary encoder may be programmed to provide a sequence of videos including regional content. In further embodiments, the main encoder may transmit a compressed main video of a real time broadcast to multiple PIP inserters, each configured to receive a different compressed secondary video. For example, there may be a PIP inserter configured to provide broadcasts, including a first compressed PIP video, to a New York audience, and a second video encoder configured to provide broadcasts, including a second compressed PIP video, with a different secondary video from the first, to a Chicago audience. Furthermore, the secondary source and the PIP inserter may be managed by an entity such as a local broadcast station in the New York area. Embodiments of the present invention enable the local broadcast station to generate the compressed PIP video with a minimal latency. In further embodiments, the director, secondary encoder, and PIP inserter are co-located.

Figure 2:
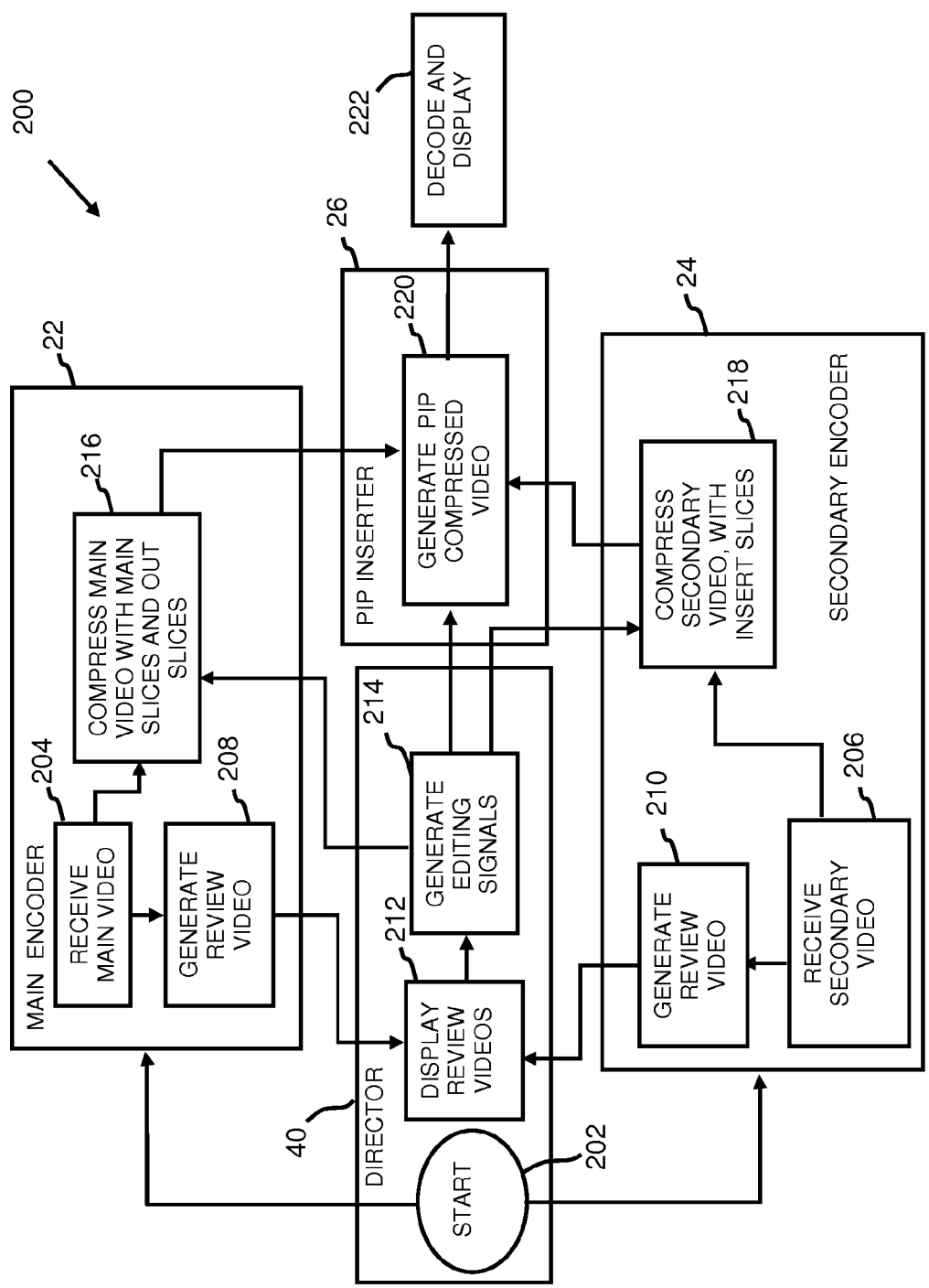
FIG. 2 is a flow diagram of a method for video processing, in accordance with an embodiment of the present invention.

FIG. 2 is a flow diagram of a method 200 of video processing. Indicated in the flow diagram are processes performed by the components of system 20 described above with reference to FIG. 1. It is to be understood that the steps of method 200 operate in real-time on multiple video streams, in the manner of a conveyor belt on which a continuous process in performed.

At a start step 202, director 40 transmits a start instruction to main encoder 22 and to secondary encoder 24. Responsively to the start instruction, the main and secondary encoders may begin to receive respective main and secondary video feeds, at respective steps 204 and 206. The main encoder then begins to generate a review main video for the director at a step 208, and the secondary encoder begins to generate a review secondary video for the director at a step 210. In an alternative embodiment, steps 208 and 210 of video reception may precede step 202, and the start instruction initiates the generation of the review videos.

The review videos from the main and secondary encoders are received and displayed by the director at a step 212.

Editing by a human operator or by an automated process positions the secondary video as an overlay over the main video on the director display. In some embodiments, editing may also include modifying the size or borders of the videos, including clipping one or both of the videos by selecting an area of the clipped video for display. Parameters of the editing are transmitted as edit signals at a step 214. The edit signals provide timing and position instructions to the main and secondary encoders, as well as to the PIP inserter. At respective steps 216 and 218, the main and secondary encoders generate respective compressed main and insert videos. The methods for generating these compressed videos are described further hereinbelow.

The compressed main and insert videos are streamed to the PIP inserter, which performs at a step 220 the video insertion process by which the compressed PIP video is generated and transmitted. The PIP inserter may begin the insertion according to a time parameter included in the edit signals. The transmitted compressed PIP video is then decoded and displayed at a step 222, typically performed by a PIP decoder, as described above with respect to FIG. 1.

FIGS. 3A and 3B are schematic illustrations of exemplary frames 302 and 304 of the compressed secondary video and of the compressed main video, respectively. Indicated within each frame are the positions of the macroblocks of the frame. Frame 302 of the compressed secondary video has macroblock dimensions of 4 columns by 3 rows. Frame 304 of the compressed main video has macroblock dimensions of 7 columns by 6 rows.

Most video recorders and displays are configured to record and to display videos having image resolutions of standard sizes, these standard sizes being referred to as Common Intermediate Formats. The resolution of several standard formats are indicated in the table below

| Video Format | Pixel Resolution | Macroblock Dimensions |
|---|---|---|
| CIF | 352 × 288 | 22 × 18 |
| QCIF | 176 × 144 | 11 × 9 |
| 4CIF | 704 × 576 | 44 × 36 |

Main and secondary video frames 302 and 304 have non-standard resolutions for the sake of elucidation, but it is to be understood that the principles described hereinbelow may be applied to main and secondary videos of any resolution, and that, in general, videos will conform to standard resolutions produced by industry recording devices.

FIGS. 4A and 4B are schematic illustrations of Network Abstraction Layer (NAL) views 402 and 404 of respective frames of the compressed secondary video and of the compressed main video, based on the exemplary dimensions given above with respect to FIGS. 3A and 3B.

The NAL views indicate the contents of bit streams of the compressed videos. A bit stream of a compressed H.264 video is divided into NAL units, which include: control sets that provide control parameters for decoding; and access units, or image slices that include sets of encoded data representing portions of each frame of the video. Control sets include Sequence Parameter Sets (SPS) and Picture Parameter Sets (PPS).

By the H.264 standard, a frame may be encoded as one or more image slices. Each image slice includes a header and data, the data being a series of encoded macroblocks (MBs). The standard macroblock size for H.264 encoding is a 16×16 pixel area. A macroblock may also be a skip macroblock, which is an indicator that the macroblock is to be decoded solely from predictive values of other macroblocks, with no residual.

In order to prepare the compressed secondary video for the video insertion process of the PIP inserter, the secondary encoder generates a bit stream with a separate image slice for each macroblock row of the secondary video frame. NAL view 402 of the compressed secondary video indicates the division of the frame of the secondary video into three slices, corresponding to the three rows of macroblocks.

NAL view 404 of the compressed main video indicates the division of the frame of the main video into seven slices. The first slice includes all macroblocks of the main video until, and not including, the macroblock position at which the secondary video will be overlaid in the PIP video. The example indicates that this will be macroblock position 15. Beginning at this position, a second slice is generated, referred to hereinbelow as an "out" slice. The out slice has the same length as each slice of the compressed secondary video frame, which, in the exemplary case, is four macroblocks. Interspersed between each "out" image slice is a "main" image slice. The main image slices include all the macroblocks that are not in the "out" image slices. The main image slices, when decoded, form the background to the overlaid secondary video. The total number of slices of a frame of the main video compressed for the video insertion process is 2R+1, where R is the number of macroblock rows of frames of the secondary video.

Figure 5:
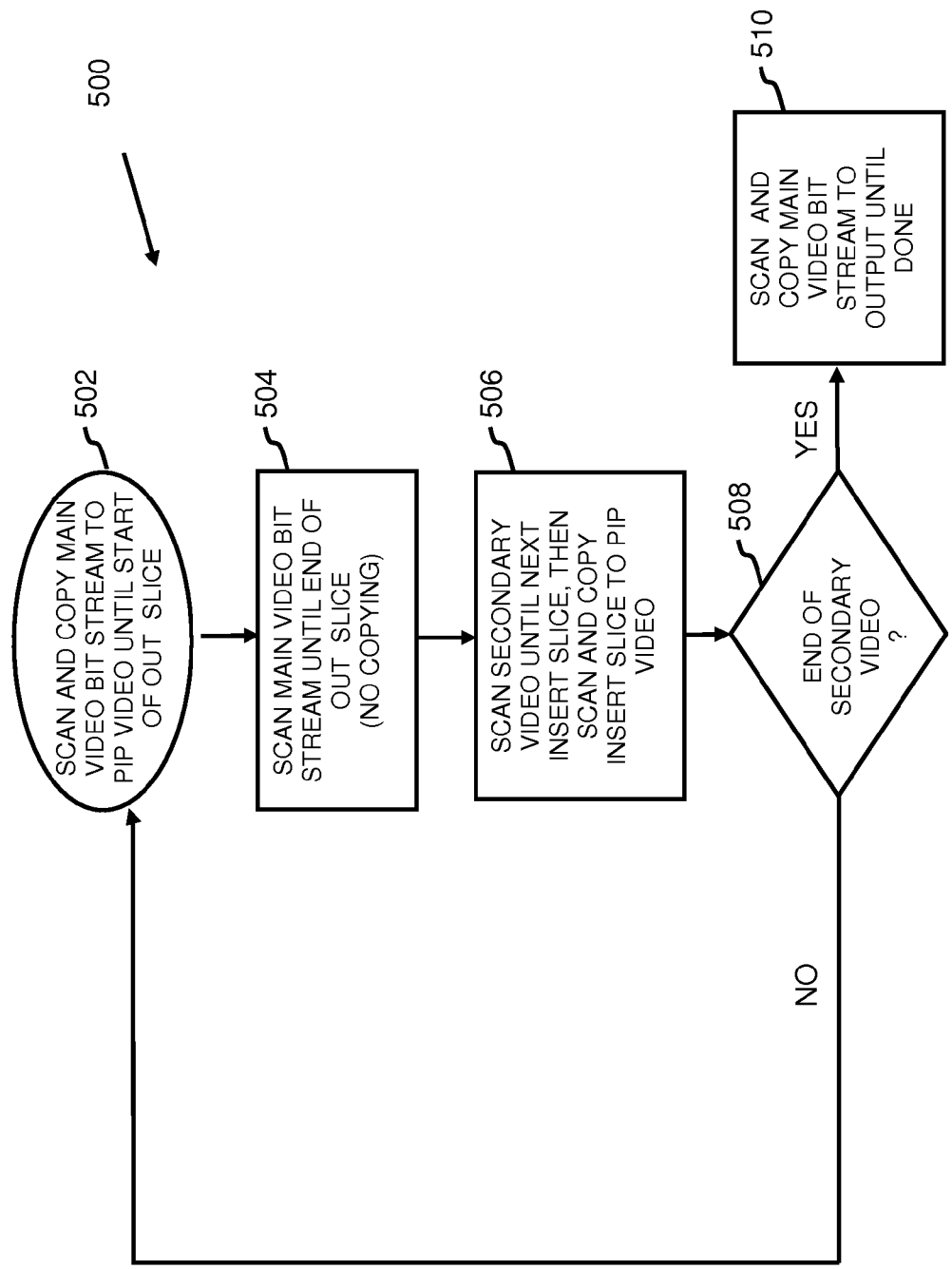
FIG. 5 is a flow diagram of a video insertion process, in accordance with an embodiment of the present invention.

FIG. 5 is a flow diagram of a method 500 of inserting the compressed secondary video into the compressed main video to generate the compressed PIP video. At an initial step 502, the PIP inserter receives compressed main and secondary video streams. Typically, the PIP inserter also receives an edit signal, as described above, indicating the time at which overlaying of the secondary video is to begin. Generally, this time is indicated as the frame of the first "out" slice, as described above. The first macroblock of the "out" slice is the starting position for the overlay.

The PIP inserter scans the bit stream of the compressed main video until reaching the first "out" slice. In some embodiments, the start of the first "out" slice is identified by the slice header identifier.

While scanning the bit stream, the PIP inserter copies all scanned data from the compressed main video to the compressed PIP video. Typically, the process is a real-time process, such that the compressed main video is received as a bit stream by the PIP inserter, and the PIP inserter simultaneously broadcasts the generated compressed PIP video.

Upon reaching the first "out" slice, the PIP inserter, at a step 504, scans the slice until reaching the next slice, without copying data of the "out" slice to the compressed PIP video. Instead, the PIP inserter, at a step 506, scans the insert video until reaching the first insert slice, and scans and copies the insert slice to the compressed PIP video.

At a decision step 508, the PIP inserter then determines if the end of the secondary video has been reached. If so, the PIP inserter proceeds at a step 510 to continue streaming the compressed main video to the compressed PIP video output, as the picture-in-picture process has been completed. If the secondary video stream has not ended, the method of video insertion continues in a loop, iterating the process of substituting "out" slices with the image slices of the compressed secondary video.

Figure 6:
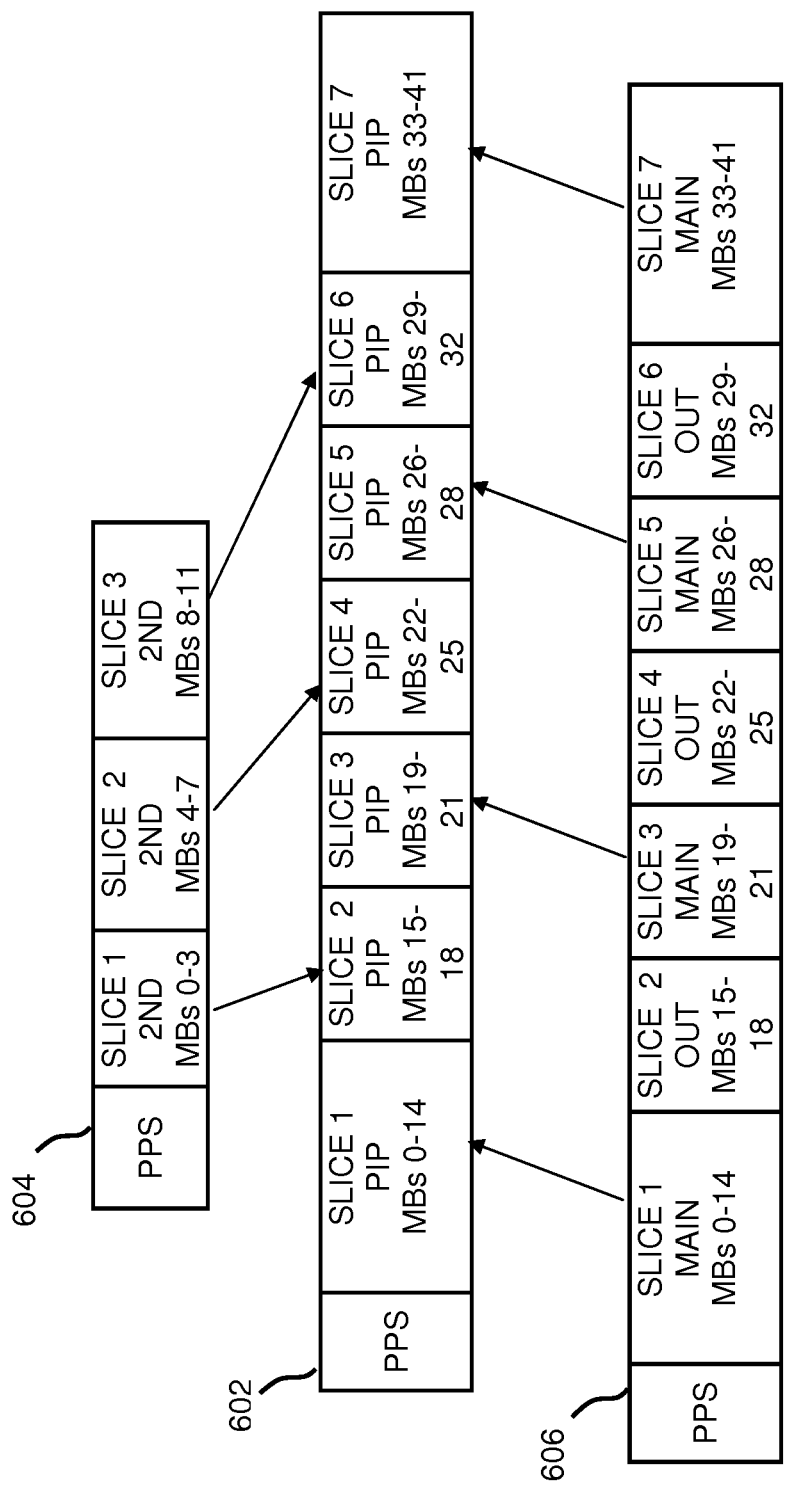
FIG. 6 is a schematic illustration of exemplary NAL views of compressed secondary and main videos merged by the video insertion process, in accordance with an embodiment of the present invention.

FIG. 6 is a schematic illustration of an exemplary PIP NAL frame 602 generated from the insertion of data from an exemplary compressed secondary video NAL frame 604 into the data of an exemplary compressed main video NAL frame

606. As indicated, the compressed PIP frame includes all data units of the compressed main video NAL frame 606, except for "out" slices, which are replaced by the complementary slices of the compressed secondary video. Additional NAL control units not shown, such as the SPS control unit, are also copied directly from the compressed main video to the compressed PIP video.

Figures 7A, 7B, 8A, 8B, 8C:
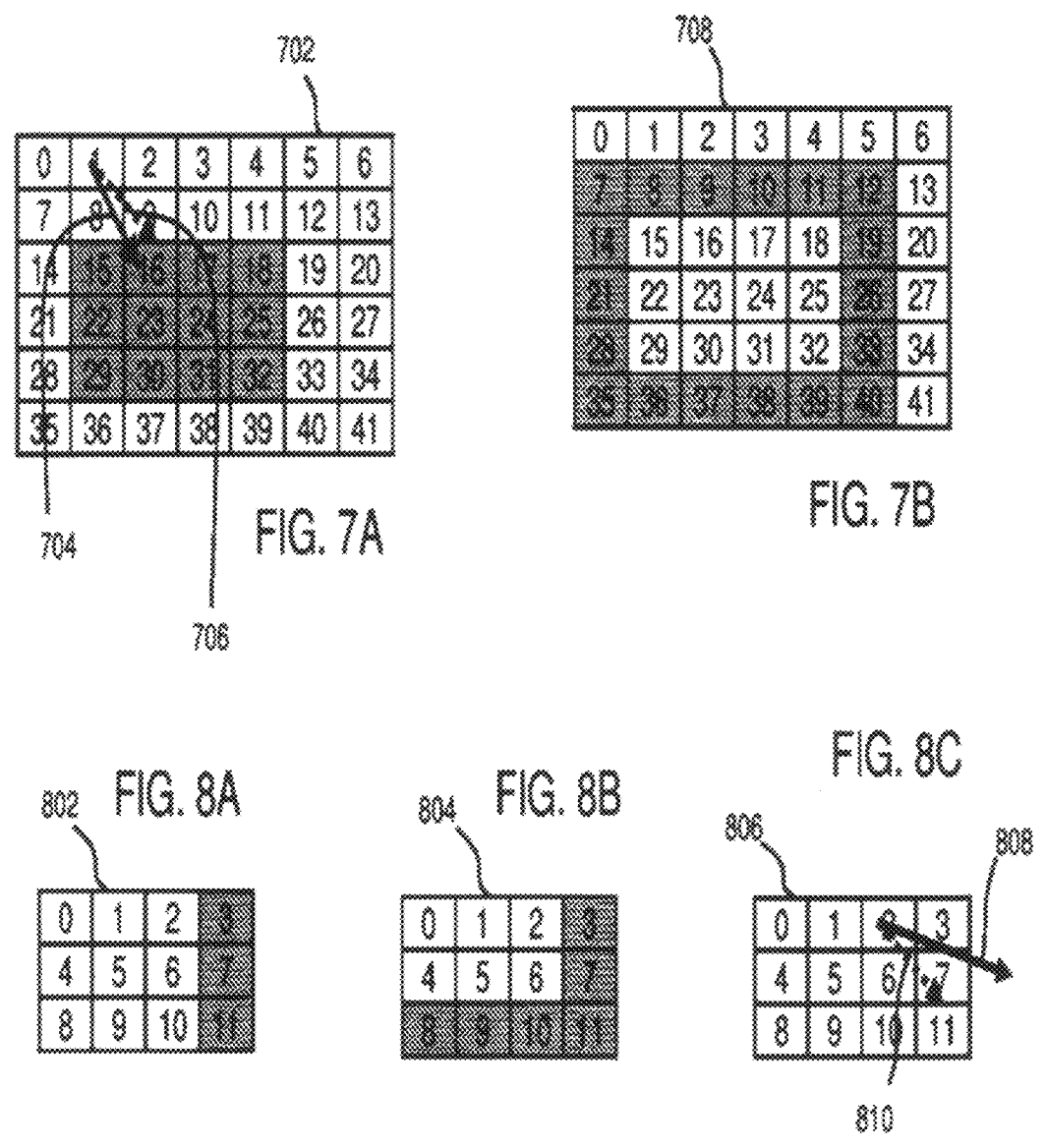

FIGS. 7A and 7B are schematic illustrations of exemplary frames of a compressed main video, which indicate additional aspects of compression performed by the main encoder for compatibility with the video insertion process.

FIG. 7A illustrates a frame 702 of the compressed main video, divided into 41 macroblocks, according to the example provided above. Main slices are indicated as white macroblocks, and "out" slices are indicated as shaded macroblocks.

For inter-frame, or "P" encoding, a macroblock is encoded based on a prediction macroblock, which is a reference to macroblocks at neighboring positions of previous frames. Prediction reference vector 704 indicates that by a standard H.264 encoding, a prediction for macroblock 1 would reference macroblock 16 of a prior frame.

To generate the compressed main video so as to be compatible with the video insertion process, the main encoder is configured to modify reference indicators of macroblocks of main slices so as not to use prediction macroblocks based on "out" slices. As an example, the encoding of macroblock 1 is modified by the main encoder to reference a macroblock near macroblock 16 but within a main slice, as indicated by prediction reference arrow 706, which points to an edge of macroblock 9 (of a prior frame). The reference must be changed to ensure that when the PIP inserter inserts secondary slices in the place of "out" slices, macroblocks of the insert slices are not referenced by main macroblocks. The change to the prediction reference is also required when the prediction is based on interpolated pixels from an "out" slice.

FIG. 7B illustrates a frame 708 of a compressed main video. Macroblocks of main slices that border "out" slices are distinguished by shading. These macroblocks are processed by the main encoder such that none are specified as "P_skip" macroblocks, that is, with skip mode disabled. As in the case illustrated above regarding FIG. 7A, a P_skip macroblock designation would cause a reference by a main macroblock to an "out" macroblock.

Compression of the secondary video must also include similar encoding methods to ensure that compressed insert slices are not encoded with references to macroblocks of the main slices. FIGS. 8A-8C are schematic illustrations of exemplary frames of a compressed secondary video, which indicate several such encoding requirements. FIG. 8A illustrates a frame 802 of a compressed secondary video, in which the final macroblocks of each insert slice is distinguished by shading. H.264 intra-frame prediction provides various modes of reference to optimize the encoding efficiency. Two of these modes, modes 3 and 7 for 4×4 bit prediction, cause a macroblock prediction to reference macroblocks that are to the right of the given macroblock's location. Consequently, the secondary encoder must disable these modes in the encoding of the macroblocks at the end of each slice, that is, in the right column of the compressed secondary video.

For H.264 inter-frame encoding, the macroblocks of the right column and bottom row of the compressed secondary video must also be encoded such that none of these macroblocks are indicated as P_skip macroblocks. FIG. 8B illustrates a frame 804 of a compressed secondary video, in which these macroblocks are distinguished by shading.

Also for inter-frame encoding, prediction references of macroblocks of insert slices may reference bits outside of the insert slices, as the H.264 H.264/AVC reference software implementation may add pixel at the edge of a frame to improve encoding efficiency. FIG. 8C illustrates a frame 806 of a compressed secondary video, in which a prediction reference vector 808 points outside of the frame of the video. Such prediction references are modified by the secondary encoder to point to an edge of the frame. Modification may be implemented by setting a flag of the JM Reference H.264 Encoder to prevent encoding outside the picture boundary (i.e., setting to zero the VUI_motion_vectors_over-_pic_boundaries_flag described in section 4.7.29.26 of the H.264 software manual, cited hereinabove). Without such modification, macroblocks of insert slices, once inserted into the PIP video, would point to main macroblocks, causing distortion in the decoded PIP video. An example of a modified reference is indicated as a prediction reference vector 810.

In addition to implementing the encoding rules illustrated in the above figures, the main and secondary encoders are further configured to ensure that compression parameters of the respective compressed main and secondary videos are compatible, including:

1) the Group of Picture (GOP) hierarchy, that is the order of I, P, and B frames,
2) the quantization parameter,
3) the number of reference frames, and
4) the frame rate.

The coordination of these parameters may be defined by the edit signals that are transmitted when the processes begin. In addition to the above settings, the first frame at which insertion begins must be generated as an I-frame for both the main and secondary videos.

It is to be understood that preferred embodiments have been described to illustrate the technology disclosed, not to limit its scope. Those of ordinary skill in the art will recognize a variety of equivalent variations. For example, encoding of the main and secondary video for compatibility with the video insertion process of the inserter may also be configured to operate with an inserter based on the High Efficiency Video Coding (HEVC) standard. As an additional example, the director may be configured to specify the insertion of multiple secondary videos into the main video. For multiple secondary videos, which may be compressed by one or more secondary encoders, the main encoder is configured to generate multiple sets of "out" slices. The PIP inserter then substitutes each set of "out" slices with the corresponding set of insert slices from one of the multiple compressed secondary videos.

What is claimed is:

1. A system for video processing, comprising:
a video director configured to generate compatible first and second edit signals;
a main video encoder configured responsively to the first edit signal to generate a compressed main video stream, including main video control sets, main image slices, and "out" image slices;
a secondary video encoder configured responsively to the second edit signal to generate a compressed secondary video stream including secondary video control sets and "insert" image slices; and
a picture-in-picture (PIP) inserter configured, responsively to receiving the compressed main video stream and the compressed secondary video stream, to copy the compressed main video stream to a compressed PIP video stream until reaching one of the "out" image slices, to scan the compressed secondary video stream until reaching a corresponding slice of the "insert" image slices, and to copy the corresponding slice of the "insert" image slices to the compressed PIP video stream.

2. The system of claim 1, wherein the video director is further configured to transmit a compatible third edit signal to the PIP inserter, and wherein the PIP inserter is configured to generate the compressed PIP video stream responsively to the third edit signal.

3. The system of claim 2, wherein the edit signals include at least one parameter from a set including a position parameter, a dimension parameter, and a time parameter.

4. The system of claim 1, wherein the compressed main video stream is a broadcast of a live event, and wherein the main video encoder is further configured to generate and to simultaneously transmit the compressed main video stream to the PIP inserter.

5. The system of claim 1, wherein the PIP inserter comprises multiple PIP inserters, wherein the compressed secondary video stream comprises multiple compressed secondary video streams, each corresponding to one of the multiple PIP inserters, and wherein each individual PIP inserter is configured to generate a respective compressed PIP video stream responsively to the compressed main video stream and to a corresponding compressed secondary video stream.

6. The system of claim 1, wherein the compressed main, compressed secondary, and compressed PIP video streams are H.264 constrained baseline-compliant video streams transmitted over an Internet connection.

7. The system of claim 1, wherein the main encoder is configured to set a Group of Picture (GOP) hierarchy in the compressed main video stream, and wherein the secondary encoder is configured to set the same Group of Picture (GOP) hierarchy in the compressed secondary video stream.

8. The system of claim 1, wherein the video director is configured to generate the edit signals by providing an interactive display for overlaying a secondary review video representing the compressed secondary video stream on a main review video representing the compressed main video stream.

9. A method of processing a video comprising:
generating compatible first and second edit signals at a video director;
receiving at a main video encoder the first edit signal and responsively generating a compressed main video stream, including main video control sets and "out" image slices;
receiving at a secondary video encoder the second edit signal and responsively generating a compressed secondary video stream, including main video control sets and "insert" image slices; and
receiving at a picture-in-picture (PIP) inserter the compressed main video stream and the compressed secondary video stream and responsively copying the compressed main video stream to a compressed PIP video stream until reaching one of the "out" image slices, scanning the compressed secondary video stream until reaching a corresponding slice of the "insert" image slices, and copying the corresponding slice of the "insert" image slices to the compressed PIP video stream.

10. The method of claim 9, further comprising receiving at the PIP inserter a compatible third edit signal generated at the video director and generating the compressed PIP video stream responsively to the third edit signal.

11. The method of claim 10, wherein the edit signals include at least one parameter from a set including a position parameter, a dimension parameter, and a time parameter.

12. The method of claim 9, wherein the compressed main video stream is a broadcast of a live event and wherein generating the compressed main video stream at the main video encoder comprises simultaneously transmitting the compressed main video stream to the PIP inserter.

13. The method of claim 9, and comprising generating multiple compressed PIP video streams at multiple PIP inserters, responsively to the compressed main video stream and to multiple compressed secondary videos streams, each corresponding to a respective one of the multiple PIP inserters.

14. The method of claim 9, wherein the compressed main, compressed secondary, and compressed PIP video streams are H.264 constrained baseline-compliant video streams transmitted over an Internet connection.

15. The method of claim 9, and comprising setting a Group of Picture (GOP) hierarchy in the compressed main video stream and setting the same Group of Picture (GOP) hierarchy in the compressed secondary video stream.

16. The method of claim 9, and comprising generating the edit signals by providing an interactive display for overlaying a secondary review video representing the compressed secondary video stream on a review video representing the compressed main video stream.

* * * * *